Figure 1B:
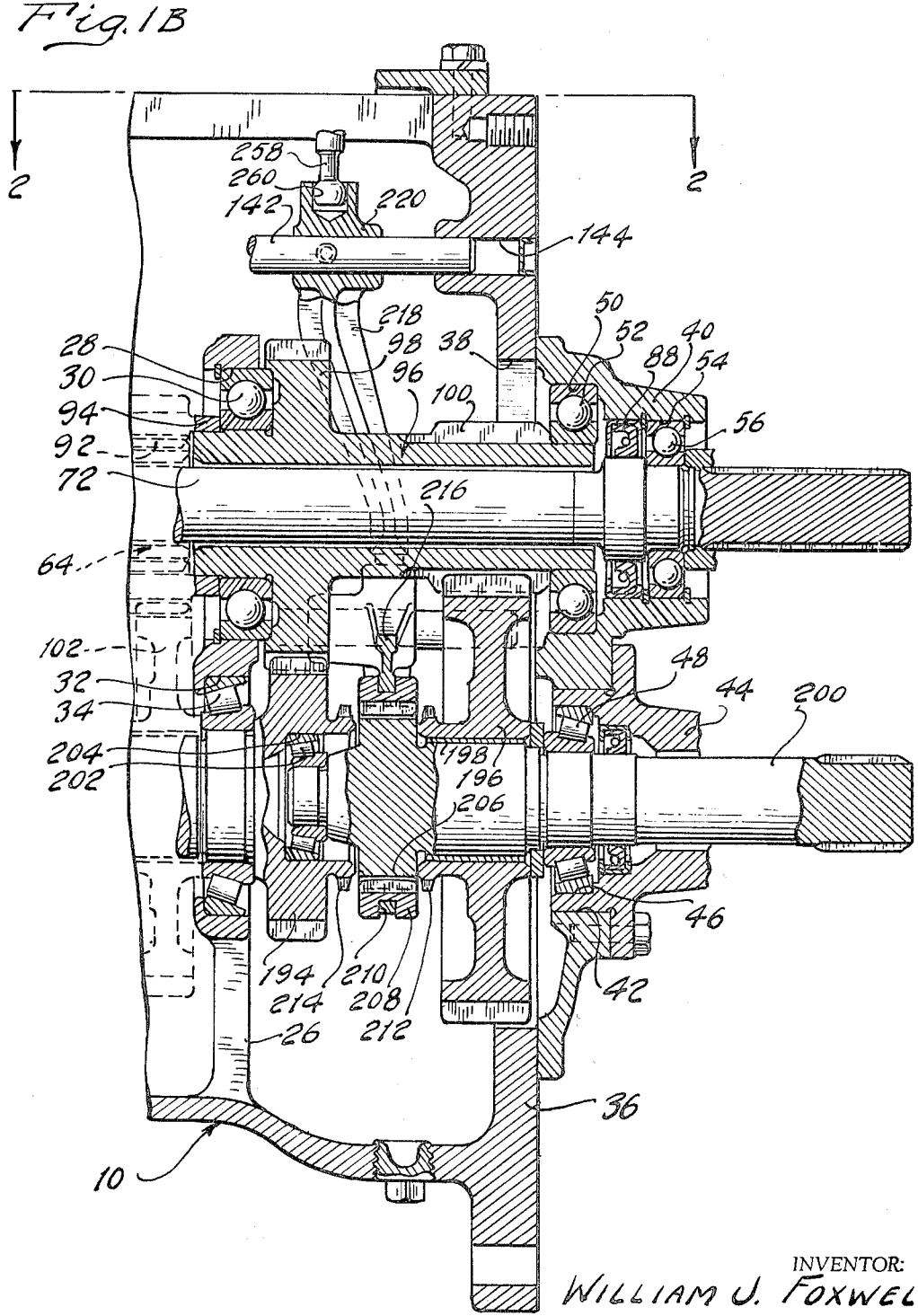

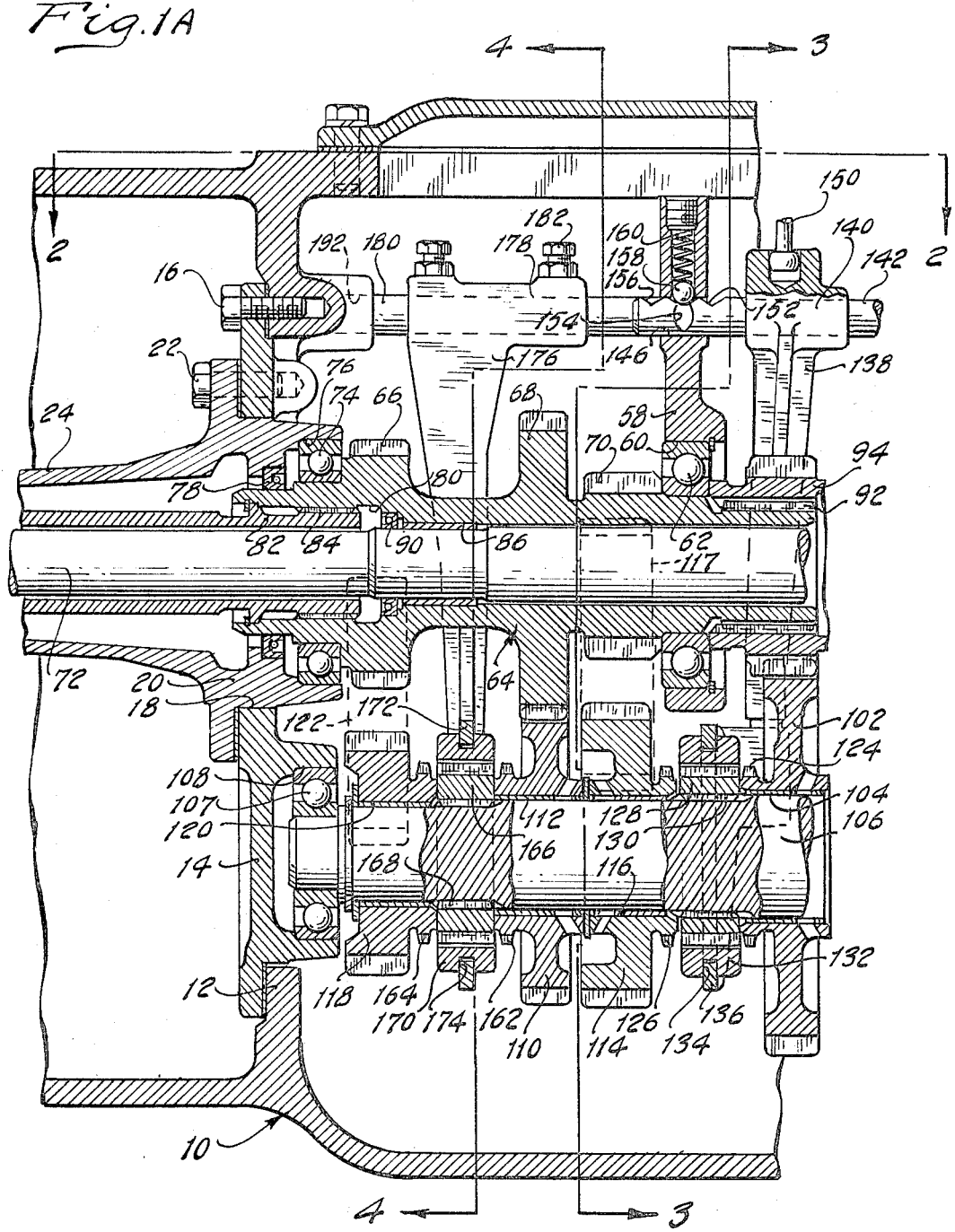

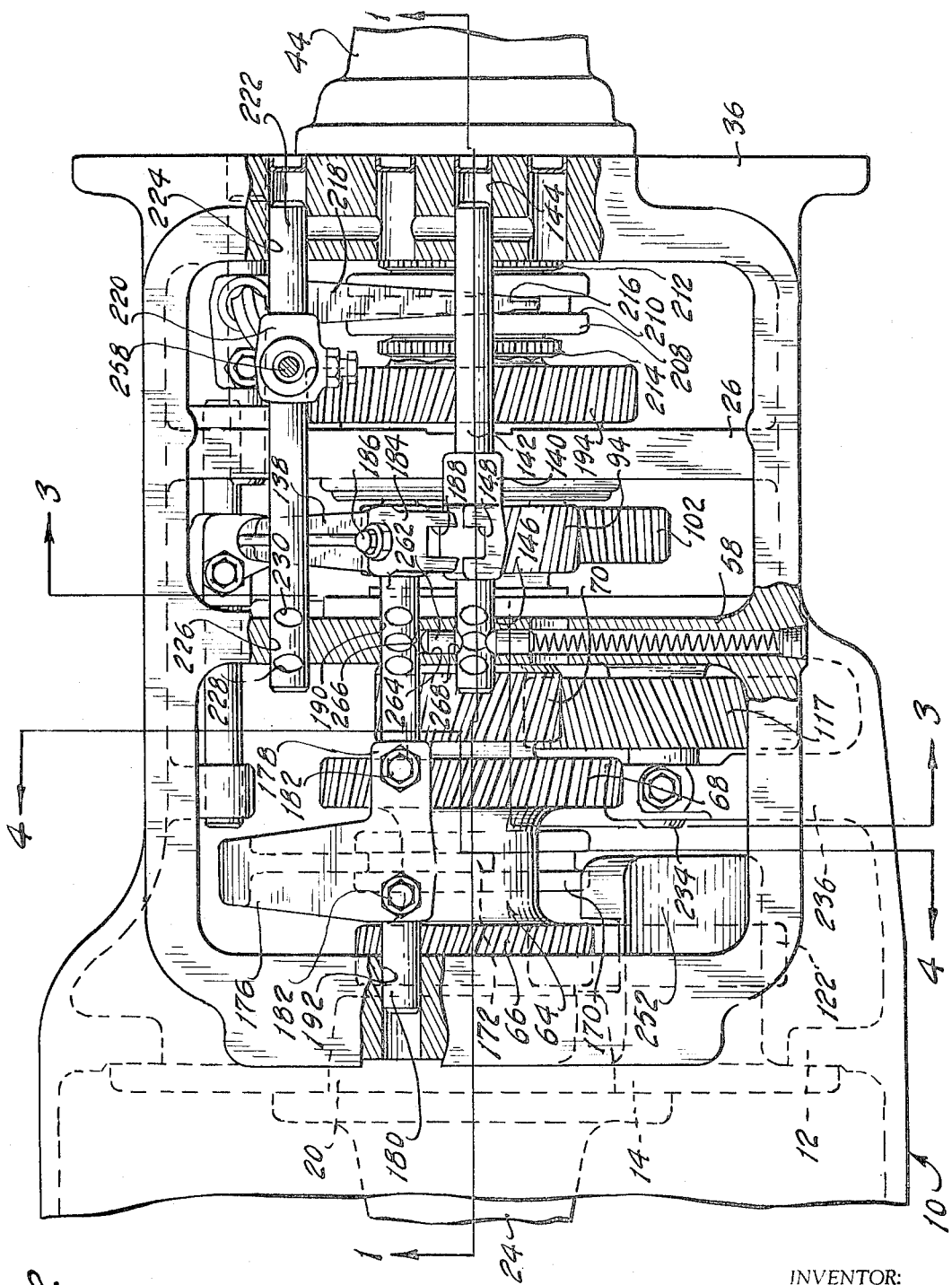

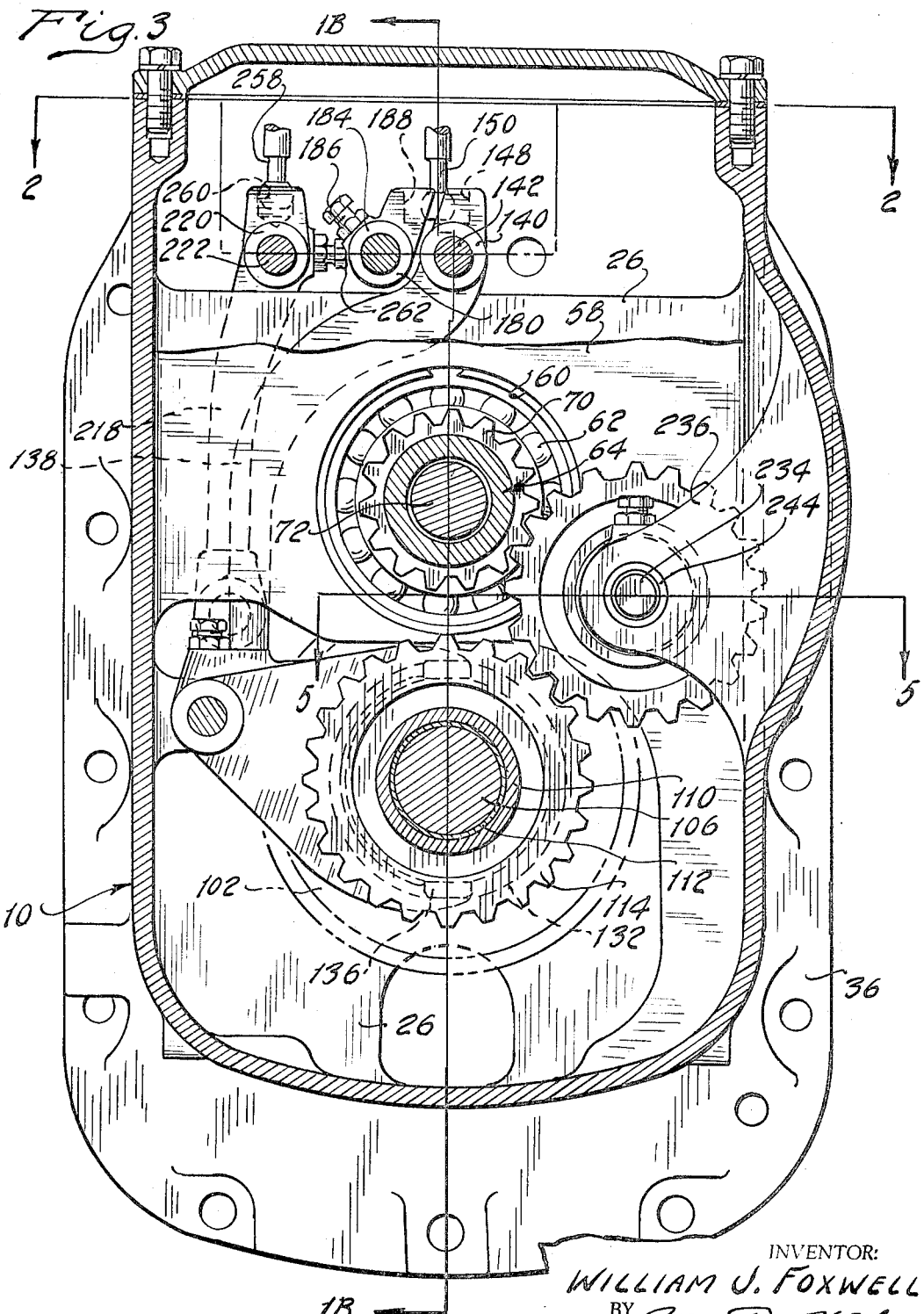

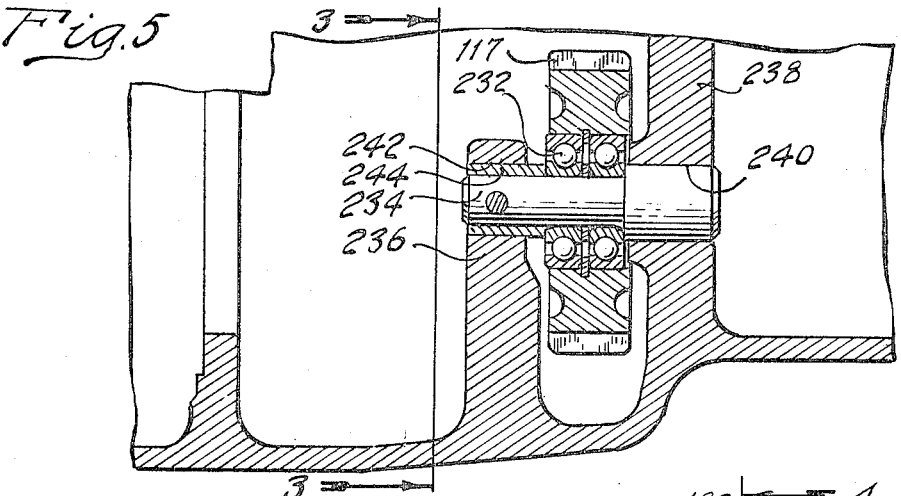
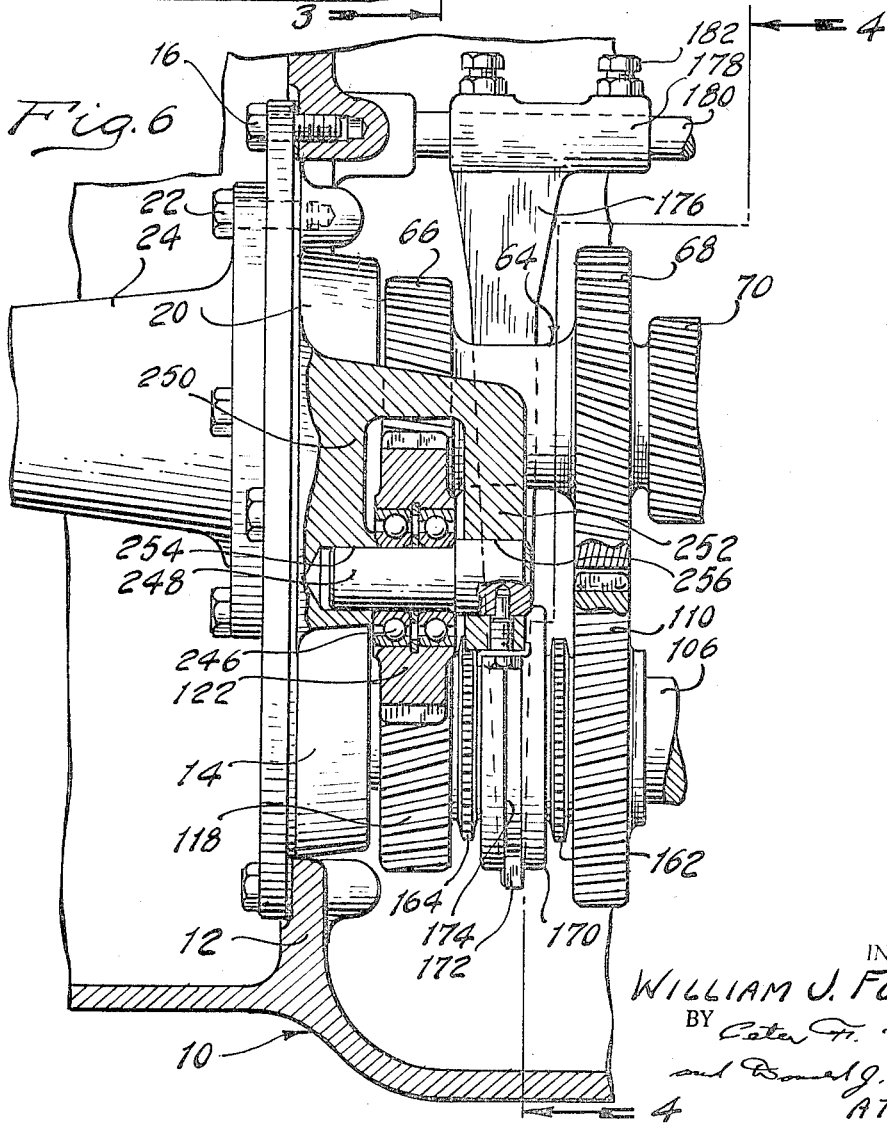

United States Patent Office 3,293,933
Patented Dec. 27, 1966

3,293,933
MULTIPLE SPEED RATIO POWER TRANSMISSION MECHANISM WITH FULL RANGE REVERSE
William J. Foxwell, Birmingham, Mich., assignor to Ford Motor Company, Dearborn, Mich., a corporation of Delaware
Filed Dec. 31, 1964, Ser. No. 422,806
7 Claims. (Cl. 74—360)

My invention relates generally to power transmission mechanisms and more particularly to multiple speed ratio power transmission mechanisms that are adapted for use in industrial tractor drivelines.

The improvement of my invention includes a strategic disposition of the torque delivery elements of the vehicle driveline which will adapted it for both a full range of forward drive ratios and a corresponding broad range of reverse drive ratios. I contemplate that my improved transmission may be used in an industrial tractor having rearwardly mounted implements, such as a fork lift mechanism or a mobile power digger. Such tractor mechanisms include a driveline and chassis assembly that can be made by modifying an agricultural tractor vehicle. These modifications may include a counterweight located at one end of an auxiliary subframe, and the implement is mounted on the chassis adjacent the large traction wheels. The counterweight in this instance maintains stability by providing a counterbalancing moment about the axis of the tractor wheels that supplements the normal moment due to the weight of the engine. In an arrangement of this type, the vehicle operator's compartment and the appropriate vehicle controls are reversed with respect to their corresponding positions when the driveline and chassis are adapted for use with an agricultural tractor vehicle.

In an installation of this type it is necessary to provide multiple forward driving ratios that permit the operator to control the load that is accommodated by the implement and to provide maneuverability. The range of ratios in both the forward driving direction and the reverse driving direction should be broad enough to permit the vehicle to creep at a very low speed or to move at a relatively high speed for transporting purposes. The transmission must also be adaptable for convenient speed ratio changes in order to satisfy changing operating requirements.

The provision of a transmission of the type above set forth being an object of my invention, it is a further object of my invention to provide a multiple speed ratio power transmission mechanism having a full range of reverse ratios and which is characterized further by two forward driving torque delivery paths and two reverse driving torque delivery paths, each path being defined in part by a common two-speed ratio gear system.

It is a further object of my invention to provide a power transmission mechanism of the type above set forth wherein the torque delivery paths are defined by two gearing stages, one stage being rotatably mounted about a principal axis and the other stage being rotatably mounted about a countershaft axis. In a preferred embodiment of my invention, the reverse driving gear elements and the forward driving gear elements are parts of a common assembly with a driven element thereof forming the power input element of a double speed-ratio gear system that completes each of the torque delivery paths extending to the driven shaft.

Figure 4:
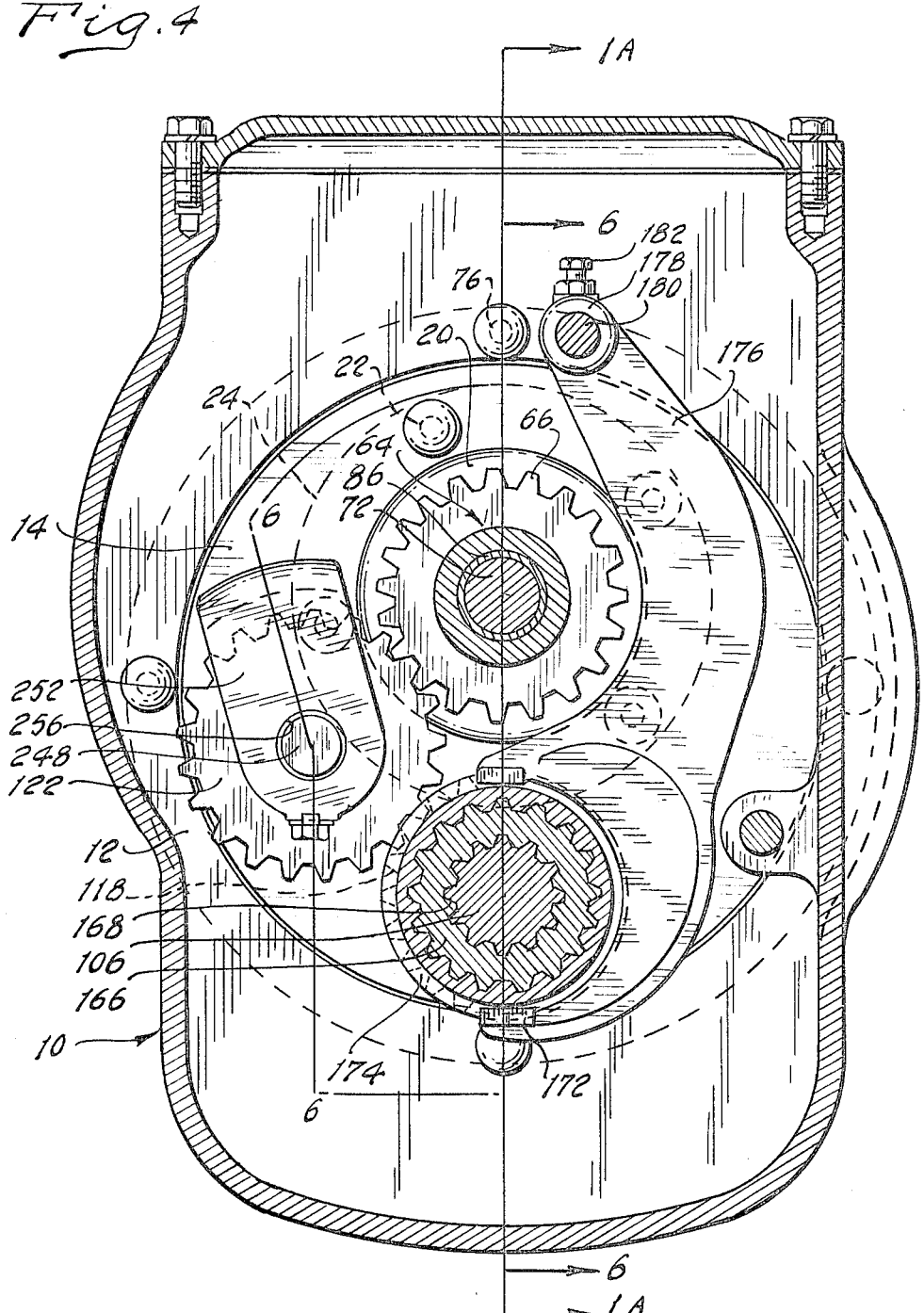

Further objects and features of my invention will become apparent from the following description and from the accompanying drawings, wherein:

FIGURE 1 shows a longitudinal cross-sectional view of my power transmission mechanism, FIGURE 2 is a cross-sectional view taken along the plane of section line 2—2 of FIGURE 1, FIGURE 3 is a transverse cross-sectional view taken along the plane of section line 3—3 of FIGURE 1, FIGURE 4 is a transverse cross-sectional view taken along the plane of section line 4—4 of FIGURE 1, FIGURE 5 is a partial cross-sectional view taken along the plane of section line 5—5 of FIGURE 3, and FIGURE 6 is a partial cross-sectional view taken along the plane of section line 6—6 of FIGURE 4.

In FIGURE 1, numeral 10 designates generally a transmission housing that may be bolted to the engine block of an internal combustion vehicle engine. A portion of the housing that forms the bolted connection with the engine, which would be to the left of the structure viewed in FIGURE 1, is not ilustrated.

The housing 10 includes an internal flange 12 to which is bolted a front plate 14, suitable bolts 16 being provided for this purpose. A central opening 18 receives a bearing support member 20, which is flanged to permit a bolted connection with the plate 14, suitable bolts 22 being provided for this purpose.

Member 20 is formed with a stationary sleeve 24 which is adapted to support a driver-operated friction clutch, not illustrated.

An intermediate supporting wall 26 also is formed within the housing 10. It includes a first bearing opening 28 for receiving ball bearing 30. It is formed also with a bearing opening 32 which receives a tapered roller bearing 34.

A rear wall 36 also is formed within the housing 10. This wall has a first opening 38 which is covered by a bearing support member 40 bolted to the end face of the wall 36. The member 40 in turn is formed with an opening 42 which receives a second bearing support member 44. That member is centrally apertured at 46 to receive a tapered roller bearing 48.

Member 40 is apertured at 50 to receive ball bearing 52. A reduced diameter portion 54 of aperture 50 receives a ball bearing 56. Another wall 58 also is formed within the housing 10 and it is formed with a bearing opening 60 which receives a ball bearing 62.

A cluster gear assembly 64 is formed with three axially spaced gear elements identified by reference characters 66, 68 and 70. Assembly 64 is formed with a central opening so that it can be journaled for rotation about a mainshaft 72. The left-hand end of assembly 64 is received within a bearing 74 which is positioned within the bearing opening 76 formed in the bearing support member 20. A fluid seal 78 seals the annular end surface of the cluster gear assembly 64 with respect to the member 20.

An internally splined end opening 80 is formed in the cluster gear assembly 64. A power input sleeve shaft 82 is splined at 84 to the assembly 64 and is received within the opening 80 as indicated. Shaft 82 may be clutched selectively by means of a driver controlled friction clutch mechanism to the vehicle engine crankshaft. A friction clutch mechanism may be provided also for selectively clutching mainshaft 72 to the engine crankshaft.

Mainshaft 72 is journaled within a central opening of the cluster gear assembly 64 by means of a bushing 86. The right-hand end of shaft 72 is journaled within the bearing support member 40 by means of a bearing 56 as indicated. A fluid seal 88 seals the right-hand end of shaft 72 with respect to the bearing support member 40. Another fluid seal 90 seals the left-hand portion of the shaft 72 with respect to the central opening of the cluster gear assembly 64.

The right-hand end of cluster gear assembly 64 is received within bearing 62 and is rotatably journaled by bearing 62 within the wall 58. The right-hand end of cluster gear assembly 64 is externally splined at 92 to an internally splined central opening formed in gear element 94.

A two element cluster gear assembly 96 also is journaled rotatably about the axis of the main shaft 72. Like the cluster gear assembly 64, assembly 96 is in the form of a sleeve that receives therethrough the shaft 72. The right-hand end of assembly 96 is received within bearing 52 and is rotatably journaled thereby within the opening 50 of the bearing support member 40. The left-hand end of assembly 96 is received within bearing 30 to provide a second end support. Formed on assembly 96 are two gear elements 98 and 100, the latter being formed with a substantially reduced pitch diameter relative to the pitch diameter of the former.

Gear element 94 meshes with a countershaft gear 102 which is journaled by means of bushing 104 on a countershaft 106. This countershaft in turn is journaled at its right-hand end by means of tapered roller bearing 34. It is journaled at its left-hand end, which may be of reduced diameter, by means of a ball bearing 107. This bearing is received within a bearing opening 108 formed in front plate 14.

Gear element 68 engages continuously another countershaft gear element 110, which is rotatably supported by means of bushing 112 on the countershaft 106.

A first reverse gear 114 is journaled at 116 on the countershaft 106. It engages drivably a reverse drive idler 117 which may be best illustrated in FIGURES 3 and 5. Idler 117 in turn drivably engages gear element 70. Another reverse drive gear 118 is journaled by means of bushing 120 on the countershaft 106. It meshes with a reverse drive idler 122, which is best seen in FIGURES 3 and 6. Idler 122 in turn drivably meshes with gear element 66 of the cluster gear assembly 64.

Gear 102 is formed with a hub having external clutch teeth 124. Corresponding clutch teeth 126 are formed on the hub of gear 114. The teeth 124 and the teeth 126 are situated on opposite sides of an internally splined clutch hub 128. Countershaft 106 is externally splined to permit a driving connection with the hub 128. The splined connection is designated by reference character 130.

Hub 128 is formed with external clutch teeth or splines on which is slidably positioned a clutch sleeve 132 having internal clutch teeth that engage external teeth of the hub 128. An annular groove 134, formed about the periphery of the sleeve 132, receives the ends of a shifter fork 136, which in turn is carried by an arm 138. The end of arm 138 terminates in a collar 140 which surrounds a shift rail 142. One end of the shift rail 142 is slidably positioned within an opening 144, formed in wall 36 of the housing 10. The other end of rail 142 is slidably positioned within an opening 146 formed in the intermediate support wall 58. Collar 140 can be formed with a recess 148 which is adapted to receive the end of a driver controlled shift linkage element 150, which may be moved to cause axial shifting movement of the shift rail 142 to any one of the three positions defined by detent recesses 152, 154 and 156 shown in FIGURE 1. A detent ball 158, which is spring loaded by means of a detent spring 160, is adapted to be received within the recesses 152, 154 and 156 as the rail 142 is shifted axially.

When the rail 142 assumes a position that causes detent ball 158 to engage recess 156, clutch sleeve 132 engages the teeth 124 thereby establishing a direct driving connection between gear 102 and the countershaft 106. When the rail 142 is shifted to the position shown in FIGURE 1, however, sleeve 132 assumes a neutral position in which the sleeve 132 is disengaged from the teeth 126 and 124. If the shift rail 142 is shifted to a position that causes ball 158 to engage recess 152, sleeve 132 drivably engages teeth 126 thereby establishing a direct driving connection between countershaft 106 and gear 114.

Gear 110 also is formed with a hub having external clutch teeth 162. Similarly, gear 118 is formed with a hub having external clutch teeth 164. Situated between teeth 162 and 164 is a clutch hub 166 which is splined at 168 to the countershaft 106. The outer periphery of hub 166 is formed with teeth or splines that mesh with internal clutch teeth formed on a clutch sleeve 170. As the sleeve 170 is shifted in the right hand direction, its internal teeth engage teeth 162 thereby establishing a direct driving connection between countershaft 106 and the gear 110. If the sleeve is shifted in a left-hand direction, teeth 164 are engaged by the internal teeth of sleeve 170 thereby establishing a direct driving connection between gear 118 and countershaft 106. Axial shifting movement of the sleeve 170 is accomplished by a shifter fork having ends 172 which are received within an annular groove 174 formed in the periphery of the sleeve 170.

The shifter fork includes an arm 176 which, as best seen in FIGURE 2, includes a collar 178 on a shift rail 180. Set screws 182 hold the collar 178 axially fast on the rail 180. Another collar 184 is carried by the right hand end of rail 180 as viewed in FIGURE 2. It is held axially fast upon the rail 180 by means of a set screw 186. Collar 184 is formed with a recess 188 which is situated in juxtaposed relationship with respect to the recess 148 of the collar 140. The linkage element 150 is adapted to be received within the recess 188 and is appropriately shifted by the vehicle operator in a direction transverse to the axes of the rails 180 and 142. After it is received within the recess 188, the element 150 can be moved by the operator to cause shifting movement of the rail 180 to any of the three axial positions that are defined by spring loaded detent elements corresponding to the detent elements 158 and 160 for the rail 142. These detent elements, of course, can be received within wall 58 which supports one end of the rail 180. An opening 190 is formed in wall 58 for receiving one end of rail 180 and the wall 12 is formed with an opening 192 for receiving the other end of the rail 180.

When the rail 180 assumes the position shown in FIGURE 2, sleeve 170 assumes the position shown in FIGURE 1. On the other hand, when the rail 180 is shifted in the right-hand direction, sleeve 170 drivably engages teeth 162 thereby forming a direct connection between gear 110 and countershaft 106. If the rail 180 is shifted in the left-hand direction as seen in FIGURE 2, sleeve 170 engages teeth 164 thereby establishing a direct connection between gear 118 and countershaft 106.

Formed on the right-hand end of the countershaft 106 is a final drive gear 194 which meshes with gear element 98 of the cluster gear assembly 96. Gear element 100 of the cluster gear assembly 96 meshes drivably with final drive gear 196 which is journaled by means of bushing 198 on power output shaft 200. This shaft is journaled by means of bearing 48 within the bearing support 44. The left-hand end of the shaft 200 is formed with a reduced diameter and is received within bearing 202. Gear 194 is formed with a central recess 204 to accommodate the bearing 202.

An externally splined clutch hub 206 is formed on or is carried by shaft 200. It supports an internally splined clutch sleeve 208 having a peripheral annular groove 210. The hub of gear 196 is formed with external clutch teeth 212 and the hub of gear 194 is formed with external clutch teeth 214. The internal teeth of sleeve 208 are adapted to engage drivably the teeth 212 and 214 as it is shifted axially. Appropriate axial shifting movement of the sleeve 208 is accomplished by means of a shifter fork 216 carried by arm 218.

A collar 220 formed on the arm 218 surrounds the third shift rail 222. One end of this rail is received within an opening 224 formed in the wall 36. The other end of the rail 222 is received within an opening 226 formed in wall 58.

Either one of two axial positions may be assumed by the rail 222. These positions are defined by detent recesses 228 and 230 as shown in FIGURE 2. These recesses may be engaged by a spring loaded detent ball of the type shown at 158 in FIGURE 1. When the rail 222 is shifted in the right-hand direction from the position that is shown in FIGURE 2, the internal teeth of sleeve 208 engage external teeth 212 thereby establishing a direct driving connection between gear 196 and power output shaft 200. On the other hand, if the sleeve 208 is shifted in a left-hand direction, the internal teeth of sleeve 208 engage external teeth 214 thereby establishing a direct driving connection between the power output shaft 200 and gear 194.

FIGURE 5 shows in detail the construction of the reverse drive idler 117. It is journaled by means of bearings 232 upon an idler shaft 234. This shaft in turn is end supported by housing bosses 236 and 238 that form a part of the housing 10. The ends of shaft 234 are received within cooperating openings 240 and 242 formed in the bosses 238 and 236 respectively. If desired, a spacer 244 surrounding shaft 234 may be received within the opening 242.

Reverse drive idler 122, as shown in FIGURE 6, is supported upon idler bearings 246 which surround idler shaft 248. This shaft is end supported by spaced bosses 250 and 252 which form a part of the housing 10. The ends of the shaft 248 are received within openings 254 and 256 formed with the bosses 250 and 252 respectively.

Shown in FIGURE 1 is a portion of a shift lever 258 which may be operated by the vehicle operator. The end of lever 258 is received within a cylindrical recess 260 formed in the collar 220. By appropriately adjusting the lever 258, the collar 220 and the rail 142 upon which it is fixed by set screw 262, can be shifted axially to establish either a high speed ratio drive range or a low speed ratio drive range. The two drive ranges that are established by the final drive gearing in this fashion are available regardless of whether the transmission is operated in reverse or in forward.

To condition the transmission mechanism for operation in the first, low speed gear ratio, the sleeve 132 is shifted in the right-hand direction thereby clutching gear 102 to the countershaft 106. Thus engine torque is delivered through the sleeve shaft 82 to the cluster gear assembly 64. This drives the gear 94, gear 102, countershaft 106, gear 194, gear element 98, gear element 100 and gear 196. If at this time sleeve 208 is shifted in a right-hand direction, gear 196 becomes clutched directly to the power output shaft 200 thereby completing the torque delivery path. Thus both a high ratio and a low ratio are available for the first drive range.

To condition the mechanism for still another forward drive range, the sleeve 132 is returned to the neutral position shown in FIGURE 1 and sleeve 170 is shifted in the right-hand direction thereby locking gear 110 to the countershaft 106. Engine torque then is delivered to the power input shaft 82, to the cluster gear assembly 64, to the gear 110, to the countershaft 106, to the gear 194, to the gear element 98, to the gear element 100 and finally to the gear 196. If the sleeve 208 is shifted in a right-hand direction, another torque delivery path is completed thereby establishing a low speed drive ratio for the second forward drive range. If the sleeve 208 is shifted in the left-hand direction, the cluster gear assembly 98 becomes bypassed and a direct driving connection is established between countershaft 106 and the power output shaft 200. The same high speed drive range is available also during operation in the first forward drive range simply by shifting the sleeve 208 in the left-hand direction when the gear 102 is functioning as a torque delivery element.

Two reverse drive ranges also are available and each reverse drive range is characterized by a high speed ratio and a low speed ratio. The first reverse drive range is accomplished by shifting sleeve 132 in the left-hand direction thereby locking gear 114 to the countershaft 106. The engine torque that is delivered to the cluster gear assembly 64 by the shaft 82 causes a reverse rotation of the gear 114 because of the action of the idler 117. Thus the countershaft 106 rotates in a direction opposite to its direction of rotation during forward drive operation. A reverse driving torque then is delivered to gear 194, to gear elements 98 and 100 and finally to the gear 196. Low speed ratio in this reverse drive range can be obtained by shifting sleeve 208 in the right-hand direction thereby again clutching gear 196 to the power output shaft 200. A high speed ratio in the first reverse drive range is obtained by shifting sleeve 208 in a left-hand direction.

The next reverse drive range is obtained by shifting sleeve 170 in the left-hand direction thereby locking gear 118 to the countershaft 106. Engine torque then is delivered from gear element 66 to the gear 118 through the reverse idler 122. Countershaft 106 then again is driven in a reverse direction. This again causes gear 194 to rotate in a reverse direction. A high speed ratio in this reverse drive range is accomplished by shifting sleeve 208 in a right-hand direction, and a low speed ratio is accomplished by shifting sleeve 208 in a left-hand direction.

If desired, independently operable shift linkage mechanisms can be provided for shift rail 222 and for the paired rails 142 and 180. It is essential, of course, that rail 180 assume a neutral position before rail 142 is shifted. Conversely rail 122 must assume a neutral position before rail 180 is shifted. To prevent simultaneous shifting movement of each rail 142 and 180, there is provided an interlock mechanism as best seen in FIGURE 2. This includes a detent plunger 262 which is slidably received within an opening 264 formed in the wall 58. Plunger 262 is located intermediate the rails 180 and 142. These rails are formed respectively with recesses 266 and 268 which register with the crowned ends of plunger 262. When plunger 262 is driven into the recess 268, shifting movement of rail 142 is prevented. Conversely, if rail 142 is shifted, plunger 262 is driven into engagement with recess 266 thereby preventing shifting of rail 180.

By way of illustration, if the engine speed of the tractor vehicle is 2100 r.p.m., the ground speed that may be obtained with the transmission mechanism conditioned for operation in the low ratio in the first forward drive range may be 2.02 miles per hour. The corresponding ground speed during operation in the first reverse drive range is 2.10 miles per hour. The highest ground speed than can be obtained for an engine speed of 2100 r.p.m. when the transmission mechanism is conditioned for operation in either the second reverse drive range or the second forward drive range is 14.50 miles per hour.

Provision may be made, as explained previously, for clutching the main shaft 72 to the engine crankshaft. The main shaft extends coaxially with respect to the cluster gear assembly 64 and 96. The right-hand end of main shaft 72, as seen in FIGURE 1, may be splined or otherwise drivably connected to the power input member of a positive displacement fluid pump. The output pressure of this pump may in turn be used for powering fluid motors for any load hoisting mechanism or for some other fluid pressure operated implement, such as a digger.

Having thus described a preferred embodiment of my invention, what I claim and desire to secure by United States Letters Patent is:

1. A power transmission mechanism having gear elements that define torque delivery paths between a driving member and a driven member, first and second gear assemblies having gear elements journaled rotatably about a common axis, a countershaft mounted in parallel disposition with respect to said common axis, gears journaled for rotation about the axis of said countershaft, final drive multiple speed ratio gearing defined in part by one of said gear assemblies, a power output element of said gearing being connected to said driven member, first and second reverse drive pinions, said first reverse drive pinion engaging drivably a gear element of the other of said gear assemblies and a first one of said gears, the second reverse drive pinion engaging another element of said other gear assembly and a second of said gears, a third element of said other gear assembly engaging a third of said gears, a fourth element of said other gear assembly engaging a fourth of said gears, a first selectively engageable clutch means for connecting at different times said fourth gear and said first gear to a power input element of said gearing and second selectively engageable clutch means for connecting at different times said third gear and said second gear to said power input element of said gearing whereby multiple ratios in both a reverse drive range and a forward drive range can be obtained.

2. A power transmission mechanism having gear elements that define torque delivery paths between a driving gear and a driven member, first and second gear assemblies having gear elements journaled rotatably about a common axis, a countershaft mounted in parallel disposition with respect to said common axis, gears journaled for rotation about the axis of said countershaft, final drive multiple speed ratio gearing defined in part by one of said gear assemblies, first and second reverse drive pinions, said first reverse drive pinion engaging drivably a gear element of the other of said gear assemblies and a first one of said gears, the second reverse drive pinion engaging another element of said other gear assembly and a second of said gears, a third element of said other gear assembly engaging a third of said gears, a fourth element of said other gear assembly engaging a fourth of said gears, a first selectively engageable clutch means for connecting at different times said fourth gear and said first gear to a power input element of said gearing and said second selectively engageable clutch means for connecting at different times said third gear and said second gear to said power input element of said gearing whereby multiple ratios in both a reverse drive range and a forward drive range can be obtained, said gearing comprising a first final drive gear and a second final drive gear, each of said final drive gears engaging separate elements of said first gear assembly and said second final drive gear being connected to said driven member.

3. A power transmission mechanism having gear elements that define torque delivery paths between a driving member and a driven member, first and second gear assemblies having gear elements journaled rotatably about a common axis, a countershaft mounted in parallel disposition with respect to said common axis, gears journaled for rotation about the axis of said countershaft, final drive multiple speed ratio gearing defined in part by one of said gear assemblies, a power output element of said gearing being connected to said driven member, first and second reverse drive pinions, said first reverse drive pinion engaging drivably a gear element of the other of said gear assemblies and a first one of said gears, the second reverse drive pinion engaging another element of said other gear assembly and a second of said gears, a third element of said other gear assembly engaging a third of said gears, a fourth element of said other gear assembly engaging a fourth of said gears, said gearing comprising a first final drive gear and a second final drive gear, each of said final drive gears engaging separate elements of said first gear assembly, said second final drive gear being connected to said driven member, a first selectively engageable clutch means for connecting at different times said fourth gear and said first gear to said first final drive gear, and second selectively engageable clutch means for connecting at different times said third gear and said second gear to said first final drive gear whereby multiple ratios in both a reverse drive range and a forward drive range can be obtained.

4. A power transmission mechanism having gear elements that define torque delivery paths between a driving member and a driven member, first and second gear assemblies having gear elements journaled rotatably about a common axis, a countershaft mounted in parallel disposition with respect to said common axis, gears rotatable on said countershaft, final drive multiple speed ratio gearing defined in part by one of said gear assemblies, first and second reverse drive pinions, said first reverse drive pinion engaging drivably a gear element of the other of said gear assemblies and a first one of said gears, the second reverse drive pinion engaging another element of said other gear assembly and a second of said gears, a third element of said other gear assembly engaging a third of said gears, a fourth element of said other gear assembly engaging a fourth of said gears, a first selectively engageable clutch means for connecting at different times said fourth gear and said first gear to a power input element of said gearing and said second selectively engageable clutch means for connecting at different times said third gear and said second gear to said power input element of said gearing whereby multiple ratios in both a reverse drive range and a forward drive range can be obtained, said gearing comprising a first final drive gear and a second final drive gear, said first final drive gear being connected to said countershaft, each of said final drive gears engaging separate elements of said first gear assembly, said second final drive gear being connected to said driven member.

5. A power transmission mechanism having gear elements that define torque delivery paths between a driving member and a driven member, first and second gear assemblies having gear elements journaled rotatably about a common axis, a countershaft mounted in parallel disposition with respect to said common axis, gears rotatable on said countershaft, final drive multiple speed ratio gearing defined in part by one of said gear assemblies, a power output element of said gearing being connected to said driven member, first and second reverse drive pinions, said first reverse drive pinion engaging drivably a gear element of the other of said gear assemblies and a first one of said gears, the second reverse drive pinion engaging another element of said other gear assembly and a second of said gears, a third element of said other gear assembly engaging a third of said gears, a fourth element of said other gear assembly engaging a fourth of said gears, said gearing comprising a first final drive gear and a second final drive gear, said first final drive gear being connected to said countershaft, each of said final drive gears engaging separate elements of said first gear assembly and said second final drive gear being connected to said driven member, a first selectively engageable clutch means for connecting at different times said fourth gear and said first gear to said first final drive gear and said second selectively engageable clutch means for connecting at different times said third gear and said second gear to said first final drive gear whereby multiple ratios in both a reverse drive range and a forward drive range can be obtained.

6. A power transmission mechanism having gear elements that define torque delivery paths between a driving member and a driven member, first and second gear assemblies having gear elements journaled rotatably about a common axis, a countershaft mounted in parallel disposition with respect to said common axis, gears rotatable on said countershaft, final drive multiple speed ratio gearing defined in part by one of said gear assemblies, first and second reverse drive pinions, said first reverse drive pinion engaging drivably a gear element of the other of said gear assemblies and a first one of said gears, the second reverse drive pinion engaging another element of said other gear assembly and a second of said gears, a third element of said other gear assembly engaging a third of said gears, a fourth element of said other gear assembly engaging a fourth of said gears, a first selectively engageable clutch means for connecting at different times said fourth gear and said first gear to a power input element of said gearing and second selectively engageable clutch means for connecting at different times said third gear and said second gear to said power input element of said gearing whereby multiple ratios in both a reverse drive range and a forward drive range can be obtained, said gearing comprising a first final drive gear and a second final drive gear, said first final drive gear being connected to said countershaft, each of said final drive gears engaging separate elements of said first gear assembly, said second final drive gear being connected to said driven member, and third selectively engageable clutch means for connecting drivably said power output shaft to said first final drive gear and to said second final drive gear thereby establishing a high speed ratio and a low speed ratio for both said forward drive range and said reverse drive range, and interlock means for preventing simultaneous engagement of said first selectively engageable clutch means and said second selectively engageable clutch means.

7. A power transmission mechanism having gear elements that define torque delivery paths between a driving member and a driven member, first and second gear assemblies having gear elements journaled rotatably about a common axis, a countershaft mounted in parallel disposition with respect to said common axis, gears rotatable on said countershaft, final drive multiple speed ratio gearing defined in part by one of said gear assemblies, a power output element of said gearing being connected to said driven member, first and second reverse drive pinions, said first reverse drive pinion engaging drivably a gear element of the other of said gear assemblies and a first one of said gears, the second reverse drive pinion engaging another element of said other gear assembly and a second of said gears, a third element of said other gear assembly engaging a third of said gears, a fourth element of said other gear assembly engaging a fourth of said gears, said gearing comprising a first final drive gear and a second final drive gear, said first final drive gear being connected to said countershaft, each of said final drive gears engaging separate elements of said first gear assembly and said second final drive gear being connected to said driven member, a first selectively engageable clutch means for connecting at different times said fourth gear and said first gear to said first final drive gear and said second selectively engageable clutch means for connecting at different times said third gear and said second gear to said first final drive gear whereby multiple ratios in both a reverse drive range and a forward drive range can be obtained, and third selectively engageable clutch means for connecting drivably said power output shaft to said first final drive gear and to said second final drive gear thereby establishing a high speed ratio and a low speed ratio for both said forward drive range and said reverse drive range, and interlock means for preventing simultaneous engagement of said first selectively engageable clutch means and said second selectively engageable clutch means.

References Cited by the Examiner
UNITED STATES PATENTS

| | | | |
|---|---|---|---|
| 2,953,943 | 9/1960 | Arnold | 74—360 |
| 3,159,044 | 12/1964 | Fevillastre | 74—745 |
| 3,173,303 | 3/1965 | Galaniuk | 74—360 |

DAVID J. WILLIAMOWSKY, *Primary Examiner.*

H. S. LAYTON, *Assistant Examiner.*